US012521992B2

(12) United States Patent

Donat Gomez et al.

(10) Patent No.: US 12,521,992 B2

(45) Date of Patent: Jan. 13, 2026

(54) PRINTING FLUID CONTAINER SUPPORTING STRUCTURES

(71) Applicant: Hewlett-Packard Development Company, L.P., Spring, TX (US)

(72) Inventors: Roger Donat Gomez, Sant Cugat del Valles (ES); Oriol Moliner Rafa, Sant Cugat del Valles (ES); Marta Ramis Llinares, Sant Cugat del Valles (ES); Ferran Esquius Rafat, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 188 days.

(21) Appl. No.: 18/692,023

(22) PCT Filed: Sep. 14, 2021

(86) PCT No.: PCT/US2021/071440

§ 371 (c)(1),
(2) Date: Mar. 14, 2024

(87) PCT Pub. No.: WO2023/043475

PCT Pub. Date: Mar. 23, 2023

(65) Prior Publication Data

US 2024/0367440 A1 Nov. 7, 2024

(51) Int. Cl.

*B41J 2/175* (2006.01)
*B41J 29/02* (2006.01)
*B41J 29/13* (2006.01)

(52) U.S. Cl.

CPC .......... *B41J 2/17509* (2013.01); *B41J 29/02* (2013.01); *B41J 29/13* (2013.01)

(58) Field of Classification Search

CPC ...... B41J 2/175; B41J 2/17509; B41J 2/1752; B41J 2/17523; B41J 29/02; B41J 29/13

See application file for complete search history.

(56) References Cited

U.S. PATENT DOCUMENTS

| | | | | |
|---|---|---|---|---|
| 6,032,010 | A * | 2/2000 | Kim | B41J 2/1755 222/DIG. 1 |
| 6,079,823 | A * | 6/2000 | Droege | B41J 2/17513 347/85 |
| 11,738,581 | B2 * | 8/2023 | de la Hoz Matveeva | B41J 25/34 347/49 |
| 2014/0253646 | A1 | 9/2014 | Koike et al. | |
| 2017/0087858 | A1 * | 3/2017 | Hayashi | B41J 2/17523 |
| 2018/0154645 | A1 * | 6/2018 | Rooney | B41J 2/17506 |

FOREIGN PATENT DOCUMENTS

| | | | |
|---|---|---|---|
| EP | 1651444 | B1 | 2/2007 |
| EP | 3268227 | B1 | 7/2020 |
| RU | 2372204 | C2 | 11/2009 |

* cited by examiner

*Primary Examiner* — Anh T Vo

(74) *Attorney, Agent, or Firm* — Foley & Lardner LLP

(57) ABSTRACT

According to an example, a printing fluid container supporting structure comprise a frame and a pivoting element coupled to the frame and to a reference surface of a printing device. The pivoting element is to enable the frame to rotate between a folded position in which the frame is aligned with the reference surface of the printing device and a deployed position in which a plurality of printing fluid container receptacles of the frame is to support a plurality of printing fluid containers in a vertical position.

15 Claims, 5 Drawing Sheets

PRINTING FLUID CONTAINER SUPPORTING STRUCTURES

BACKGROUND

Printing fluid supplies may be used to supply printing fluid to printing systems. In some examples, printing fluid supplies may be provided in the form of removable printing fluid containers, where the removable printing fluid containers are fluidly connected to printing fluid tanks of the printing system. In order to hold the printing fluid containers, the printing systems may use printing fluid container supporting structures.

BRIEF DESCRIPTION OF DRAWINGS

Features of the present disclosure are illustrated by way of example and are not limited in the following figure(s), in which like numerals indicate like elements, in which.

DETAILED DESCRIPTION

Figure 1:
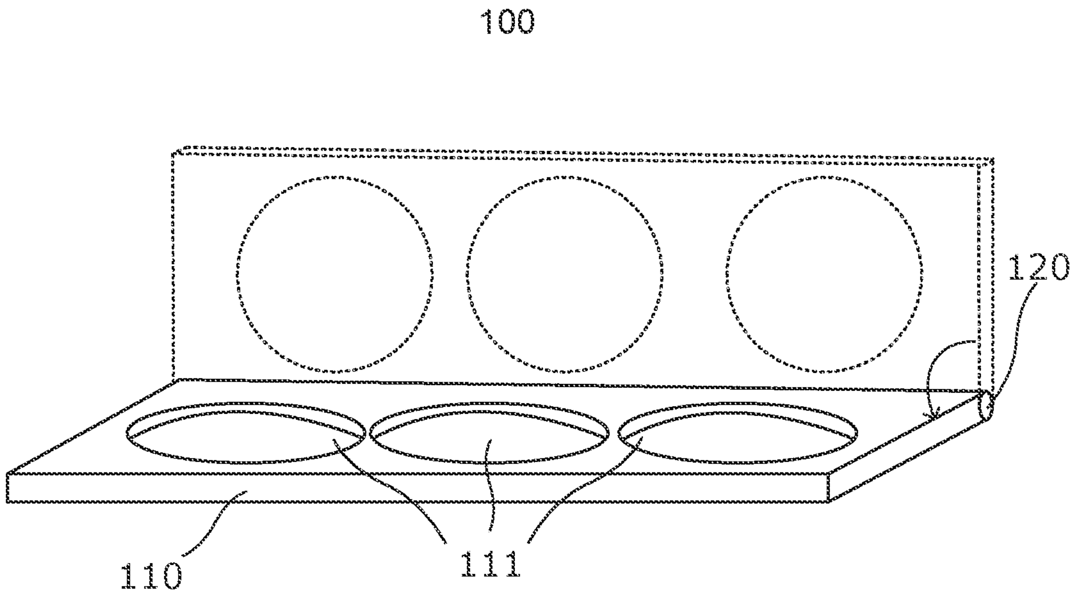
FIG. 1 shows a printing fluid container supporting structure, according to an example.

For simplicity and illustrative purposes, the present disclosure is described by referring mainly to examples. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

In use, printing systems perform printing operations in accordance with print jobs previously submitted by a user. In order to obtain the desired contents specified by a print job on a printing medium, a printing system may eject multiple printing fluids on the print medium during the same printing operation. In addition to ejecting the printing fluids, the printing operation may further comprise additional actions such as servicing routines, pre-processing operations, and post-processing operations.

To supply a printing system with printing fluids, the printing system may comprise printing fluid supplies fluidly connected to printing fluid dispensers of the printing system. In some examples, the printing fluid supplies may be part of the fluid dispensers (for instance, printheads comprising printing fluid chambers). However, in other examples, the printing system may have the printing fluid supplies remotely located from the printing fluid dispensers of the printing system. In some examples, when the printing fluid supplies are remotely located, the printing fluid supplies may be held via a plurality of printing fluid container support structures. In an example, the supporting structure may be in the form of a series of printing fluid supply slots. In other examples, the printing system may comprise printing fluid slots fluidly connected to a series of printing fluid tanks such that the printing fluid is received by the printing fluid tanks from printing fluid supplies which are temporarily connected to the printing fluid supply slots.

Due to the size and the printing loads of a printing system may vary, printing systems may use printing fluid supplies having different printing fluid capacities. When having a series of printing fluid supply slots within the printing system, the size of the printing fluid supply (and therefore, the overall printing fluid volume within the printing fluid supply) may be constrained by the maximum available space within the printing system. Aligned with the capacity constraints, the usage of printing fluid slots can increase idle times associated with the replacement of the printing fluid supplies. On the other hand, when using removable printing fluid supplies to feed printing fluid tanks with printing fluid, the size of the printing fluid supply may be modified within a wider range of possibilities. In addition, since the printing fluid dispensers receive the printing fluid from the printing fluid tanks instead of the removable printing fluid supplies, the idle times associated with the replacement of the removable printing fluid supplies.

Printing systems that comprise printing fluid tanks to receive printing fluid from removable printing fluid supplies may have to periodically undergo a refilling operation. During the refilling operation, the removable printing fluid supplies are temporary fluidly connected to the printing fluid tanks via printing fluid input connectors. In some examples, the refilling operation may be manually performed by the user of the printing system. Due to the capacity of the printing fluid tanks may vary among printing systems, the refilling frequency is not the same for all types of printing systems. Similarly, due to the contents to be printed by the printing system may not uniformly use the printing fluids of the printing fluid tanks, the refilling frequency is also affected by the printing fluid usage.

In an example, in order to effectively refill a printing fluid tank of a printing system, the printing fluid supply may be fluidly connected to the printing fluid tank via printing fluid input connectors. In some examples, the printing fluid input connectors may be arranged to receive the printing fluid supply in a vertical position such that an aperture of the printing fluid supply located in a bottom region of the printing fluid supply is fluidly connected to the printing fluid tank. As a result, as soon as the printing fluid supply outlet is connected to the printing fluid input connectors, the gravity will cause the printing fluid within the printing fluid supply to flow from the printing fluid supply towards the printing fluid tank. In other examples, the printing fluid tanks may be pressurized at a lower pressure with respect to the printing fluid supplies in order to cause the printing fluid within the printing fluid supply to move towards a lower pressure region of the printing fluid tank. In some other examples, the printing fluid input connectors may be connected to the printing fluid tanks via a pumping system in order to move the printing fluid from the printing fluid containers to the printing fluid tanks.

However, during the printing fluid tank refilling operations, users may have to hold the removable printing fluid supplies in a vertical position during the whole refilling operation. Otherwise, the connection between the removable printing fluid supply and the printing fluid input connectors will be a faulty connection which may lead to damage over the printing fluid input connector, the removable printing fluid supply, or spilling printing fluid over a region of the printing system. Hence, if the user is unable to hold at the same time multiple removable printing fluid supplies in the vertical position, users may have to repeat the refilling operation for each of the remaining printing fluid tanks in order to effectively refill the printing fluid tanks.

As explained above, when using removable printing fluid containers, the refilling operations may imply a user to hold the containers during the refilling operation in order to ensure an effective refilling. In particular, due to the capacity of the removable printing fluid containers may be greater than 0.3 liters, in some examples, users may have to hold the containers in place more than 2 minutes to refill one of the printing fluid tanks. In some examples, printing fluid containers manufacturers may design the printing fluid containers with a high capacity (for instance, 0.5 liters) to reduce the number of refilling operations to be performed by the user of the printing system. However, the overall weight of the printing fluid container increases as the capacity of the printing fluid containers increases, and therefore, users may have to hold further loads during an additional time (for instance, a refilling operation using printing fluid container of 0.5 liters may take more than 3 minutes to be performed).

Disclosed herein are examples of supporting structures, printing systems, and methods that may be used to effectively perform refilling operations. Hence, different examples of apparatuses, systems, and methods are described.

According to an example, a supporting structure for holding printing fluid containers may be used to hold a plurality of printing fluid containers in a vertical position. In an example, the supporting structure may comprise a foldable frame movable between a non-operative position and an operative position. In the non-operative position, the supporting structure may be aligned with a surface of a printing device so that the supporting structure does not extend from the surface. In the operative position, the supporting structure extends from the surface of the printing device such that printing fluid containers can be inserted in a plurality of printing fluid container receptacles of the supporting structure. In some examples, the plurality of printing fluid receptacles of the supporting structure may be arranged to be associated with a plurality of printing fluid input connectors of the printing device. In this fashion, when the supporting structure is in the operative position, a printing fluid container inserted in a printing fluid container receptacle will be connected to the printing fluid input connector associated with the receptacle in which the container has been inserted.

As used herein, the term "printing fluid container" will be used to refer to a removable printing fluid supplies to be used in a refilling operation of a printing system. Examples of printing fluid containers comprise printing fluid bottles, printing fluid canisters, and any other element capable of storing printing fluid.

Referring now to FIG. 1, a printing fluid container supporting structure 100 is shown. In use, the printing fluid container supporting structure 100 may support a plurality of printing fluid containers (not shown in FIG. 1) during a refilling operation of a printing device. The printing fluid container supporting structure 100 comprises a frame 110 comprising a plurality of printing fluid container receptacles 111 and a pivoting element 120 coupled to the frame 110 and to a reference surface (not shown in FIG. 1) of the printing device. In particular, the plurality of printing fluid receptacles 111 are arranged to correspond to printing fluid input slots (not shown in FIG. 1) of the printing device. The pivoting element 120 rotatably couples the foldable frame 110 to the reference surface of the printing device such that a range of angular positions may be possible between the frame 110 and the reference surface. For instance, in FIG. 1, the pivoting element 120 is to enable the frame 110 to rotate between a folded position (represented in dashed lines) in which the frame is aligned with the reference surface of the printing device and a deployed position (represented in solid lines) in which the plurality of container receptacles 111 is to support a plurality of printing fluid containers connected to the printing fluid ports in a vertical position.

In some examples, the frame 110 is moved to the deployed position prior to a refilling operation in which the printing fluid containers are inserted in the printing fluid container receptacles 111 of the frame 110. Then, upon inserting the printing fluid containers in the printing fluid container receptacles 111, a contact of the printing fluid containers with an inner region of a receptacle of the printing fluid receptacles 111 will keep the printing fluid containers in the vertical position during the whole refilling operation without the assistance of a user of the printing fluid container supporting structure 100.

Although in FIG. 1 each of the printing fluid container receptacles 111 of the printing fluid container supporting structure 100 is rounded-shaped, in other examples alternative shapes may be possible. In some examples, each receptacle of the printing fluid container receptacles may have different sizes and/or shapes in order to avoid positioning of the printing fluid containers. Accordingly, each printing fluid container may comprise different shapes and/or sizes that may fit the corresponding container receptacles.

In some other examples, each receptacle of the plurality of printing fluid container receptacles 111 may comprise a clamping member biased towards an inner region of the receptacles such that the inserted printing fluid container is clamped by the clamping member.

Figure 2:
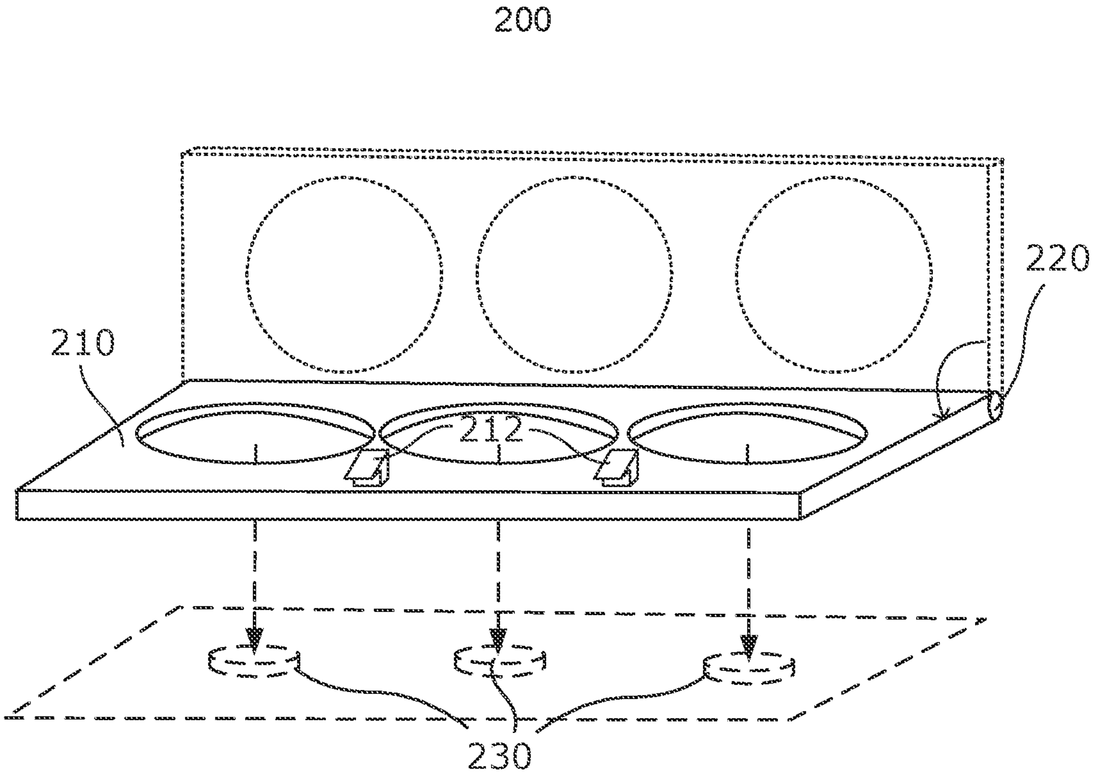
FIG. 2 shows a printing fluid container supporting structure comprising snap-fit elements, according to an example.

Referring now to FIG. 2, a printing fluid container supporting structure 200 including snap-fit elements 212 is shown. The printing fluid container supporting structure 200 comprises a frame 210 and a pivoting element 220, where the frame 210 comprises snap-fit elements 212 connectable to a reference surface of the printing device (not shown in FIG. 2). As explained above, the frame 210 is movable between a folded position in which the frame 210 is aligned with the reference surface and a deployed position in which the frame 210 is to receive a plurality of printing fluid containers in a vertical position. In particular, the frame 210 is to receive the plurality of printing fluid containers in a plurality of printing fluid container receptacles, as previously explained in reference to FIG. 1.

In order to enable a rotation of the frame 210 with respect to the reference surface of the printing device, the printing fluid container supporting structure 200 comprises the pivoting element 220. In some examples, the pivoting element 220 may comprise a locking member to limit a rotation within a range from the folded position (represented in FIG. 2 in dashed lines) of the frame 210 and the deployed position (represented in FIG. 2 in solid lines) of the frame 210. In some other examples, the locking member may lock the frame 210 of the supporting structure 200 in at least one of the deployed position and the folded position.

In FIG. 2, a plurality of printing fluid input connectors 230 is represented in dashed lines. In order to enable an effective connection between the printing fluid containers and the plurality of printing fluid input connectors 230, the printing fluid input connectors 230 are arranged to correspond to the plurality of receptacles of the frame 210 when the frame 210 is in the deployed position. As a result, a printing fluid receptacle insertion (in FIG. 2, examples of insertions are represented with the dashed line arrows) leads to a connection between the printing fluid receptacle and the respective printing fluid input connector of the plurality of printing fluid input connectors 230. In an example, the refilling operation may comprise moving the frame 210 to the deployed position and inserting the printing fluid containers in the plurality of printing fluid container receptacles. Then, upon an outlet of the printing fluid container is connected to the printing fluid tank via the printing fluid input connectors 230, the printing fluid within the printing fluid container is to flow printing fluid from the printing fluid container towards the printing fluid tank. In addition, since the printing fluid container receptacles hold the printing fluid containers in a vertical position in which the outlet of the printing fluid container is in a bottom region of the container, the gravity will contribute to flowing the printing fluid within the printing fluid container towards the printing fluid tanks tank without the assistance of a user of the printing device. As previously explained, in some examples, the printing fluid tanks may be pressurized at pressures lower than the pressure within the printing fluid containers in order to decrease the refilling times of the refilling operation.

The frame 210 of the printing fluid supporting structure 200 comprises snap-fit elements 212 in a distal region of the frame 210. The snap-fit elements 212, which comprise sloped surface and variable thicknesses, are connectable to the reference surface. In this fashion, the frame 210 can be locked in a folded position when not in use. In an example, the frame 210 may be rotated back to the folded position upon a refilling operation has been performed.

In some examples, the weight of the frame 210 may be distributed so as to bias the frame 210 towards the deployed position. In an example, a distal region of the frame 210 may comprise a protruding element in a bottom face in order to obtain an unstable equilibrium point so that the frame 210 is biased to the deployed position upon the snap-fit elements 212 are disconnected from the reference surface of the printing device. In this fashion, a semi-automatic deployment of the supporting structure 200 will be obtained.

Although the snap-fit elements 212 of the printing fluid supporting structure 200 correspond to a pair of cantilever snap-fit elements, in other examples, alternative configurations may be possible. Accordingly, alternative examples may comprise other types of snap-fit element(s), other location(s) for the snap-fit element(s), and a different number of snap-fit element(s).

Figure 3:
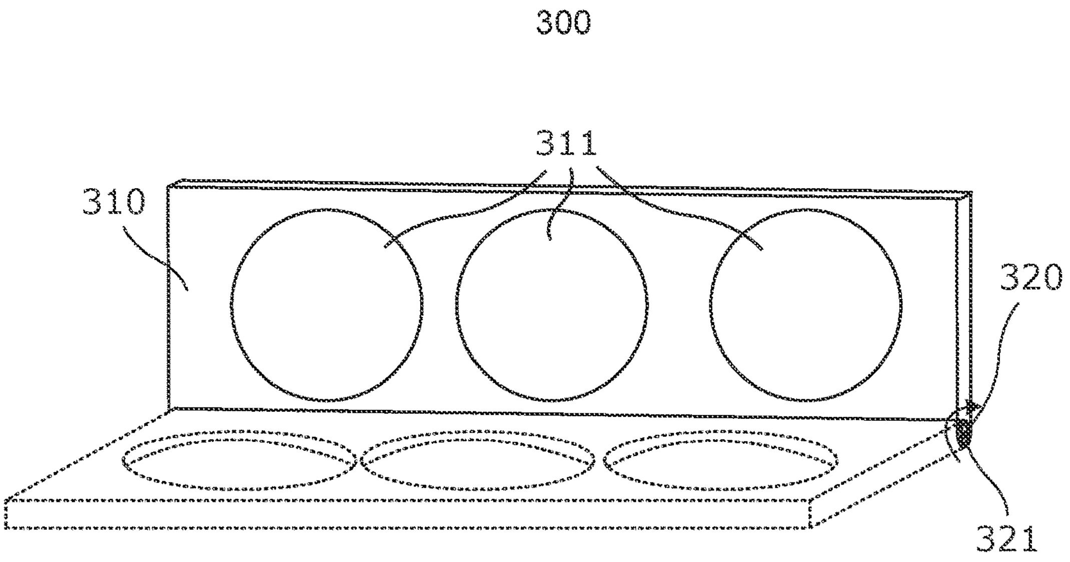
FIG. 3 shows a printing fluid container supporting structure comprising a biasing member to bias the frame towards a folded position, according to an example.

Referring now to FIG. 3, a printing fluid container supporting structure 300 including a biasing member 321 is shown. The printing fluid container supporting structure 300 comprises a frame 310 and a pivoting element 320. In FIG. 3, the frame 310 is represented in a folded position in which the frame 310 is aligned with a reference surface of the printing device (not shown in FIG. 3). As described above, in order to hold printing fluid receptacles in a vertical position, the frame 310 comprises a plurality of printing fluid container receptacles 311 to support a plurality of printing fluid containers in the deployed position of the frame 310.

In FIG. 3, the pivoting element 320 of the printing fluid container supporting structure 300 comprises the biasing member 321 to bias the frame 310 to a folded position. In an example, the biasing member 321 may be an elastic element capable of deforming as a result of a force and capable of returning to its initial shape when releasing the force. Examples of elastic elements comprise springs, spring plates, among others. In an example, the biasing member 321 may be dimensioned such that the torque generated by the biasing member 321 does not rotate the frame 310 when printing fluid containers are inserted in the plurality of printing fluid container receptacles 311. Then, upon removing the printing fluid containers from the plurality of printing fluid container receptacles 311 of the frame 310, the biasing member 321 causes the frame 310 to rotate to the folded position, thereby leading to a semi-automatic folding operation.

In some examples, the pivoting element 320 may further comprise a locking member to lock a rotation of the frame 310 with respect to the reference surface of the printing device. Hence, by locking the rotation, external forces applied towards the frame 310 will be prevented from modifying a relative position of the frame 310 with respect to the reference surface of the printing device.

Although in the frames 110, 210, and 310 each printing fluid container receptacles is at a distance with respect to the neighboring receptacles, in other examples the printing fluid container receptacles may overlap with each other. As a result, the plurality of printing fluid container receptacles is to support a plurality of printing fluid containers inserted in non-adjacent receptacles, and therefore, the plurality of printing fluid containers may be connected to non-adjacent ports of the printing fluid input ports of the printing device.

Figure 4:
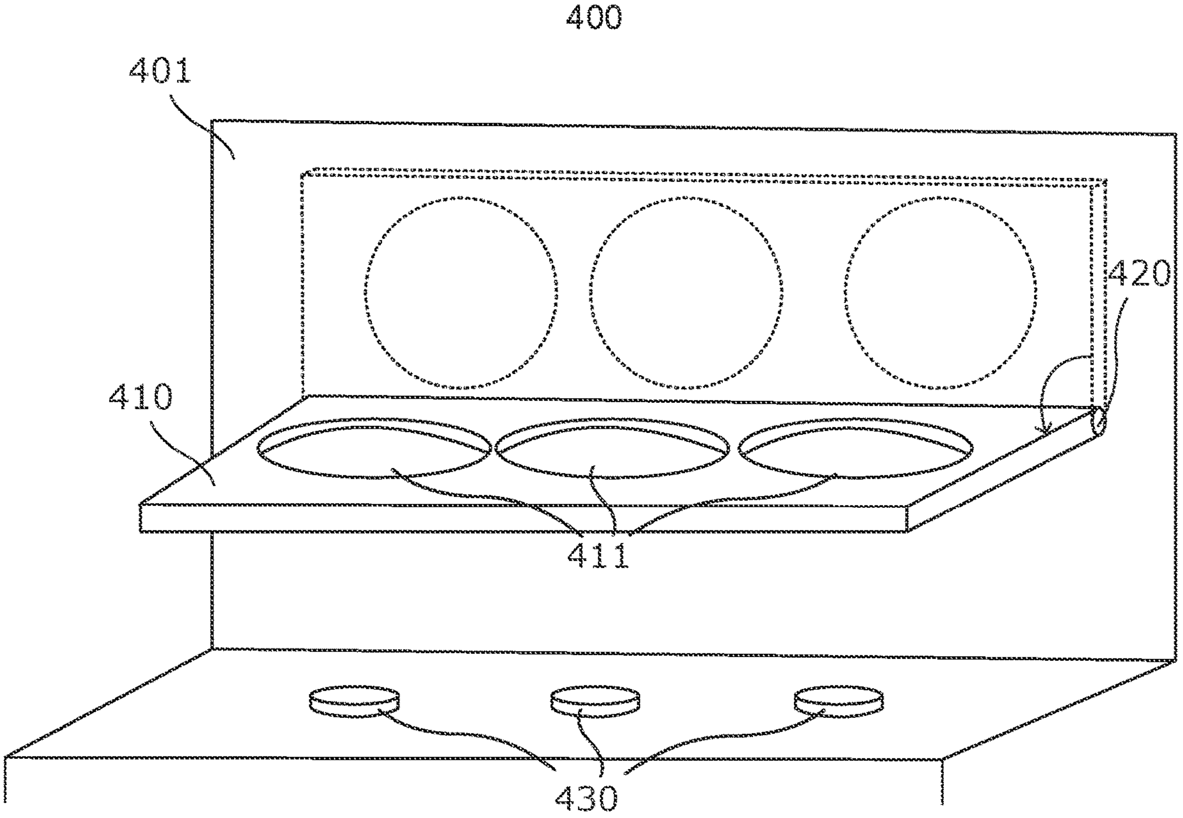
FIG. 4 shows a printing system comprising a supporting structure, according to an example.

Referring now to FIG. 4, a printing system 400 is shown. The printing system 400 comprises a reference surface 401, a supporting structure rotatably coupled to the reference surface 401, and printing fluid container input connectors 430. In order to rotatably couple the foldable frame 410 to the reference surface 401 the supporting structure further comprises a pivoting element 420. As a result, the frame 410 is movable between a folded position (represented in dashed lines in FIG. 4) and a deployed position in which the frame 410 is to receive in a plurality of apertures a plurality of printing fluid receptacles in a vertical position.

In order to effectively connect the printing fluid containers inserted in the plurality of apertures 411 of the frame 410 of the supporting structure, the printing fluid container input connectors 430 are arranged to correspond to the plurality of apertures 411. Therefore, when having the frame 410 in the deployed position, a printing fluid container inserted in one of the apertures will be connected to a respective printing fluid container input connector.

In some examples, the plurality of apertures 411 may overlap with each other such that the frame 410 of the supporting structure is to receive printing fluid containers in non-adjacent apertures of the plurality of apertures. In an example, the plurality of apertures 411 may be a plurality of overlapping circular apertures arranged to receive the plurality of printing fluid containers in non-adjacent apertures.

In this fashion, the overall size of the frame 410 may be reduced while still providing induvial apertures for each printing fluid container. Nonetheless, in some other examples, the plurality of overlapping apertures may comprise a different shape instead of circular.

Although in FIG. 4 the printing system 400 includes a supporting structure corresponding to the printing fluid supporting structure 100 previously explained in reference to FIG. 1, in other examples, alternative supporting structures may be possible. For instance, in some examples, the printing system 400 may comprise the printing fluid supporting structures 200 and 300 previously explained in reference to FIGS. 2 and 3.

Figure 5C:
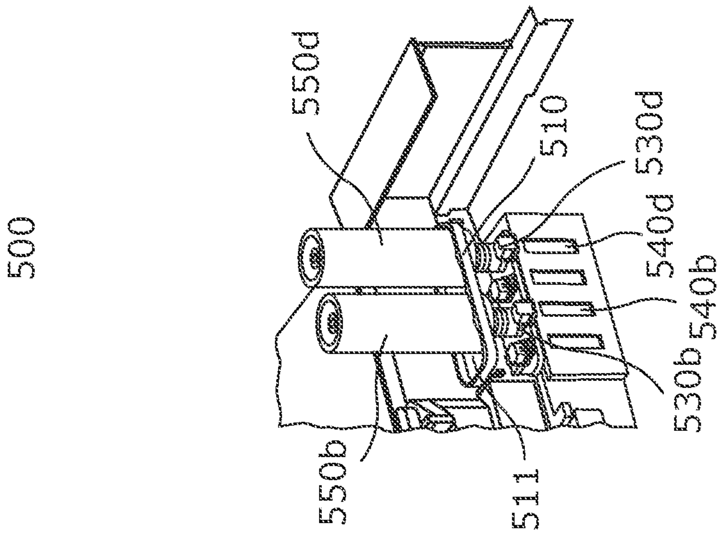
FIG. 5C shows the system of FIG. 5B with printing fluid containers inserted in the apertures of the foldable frame.
Figure 5B:
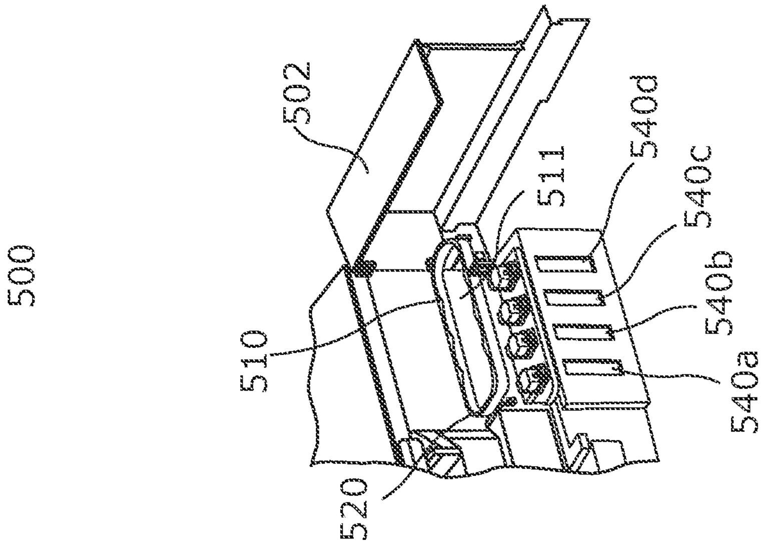
FIG. 5B shows the system of FIG. 5A with the foldable frame in a deployed position.
Figure 5A:
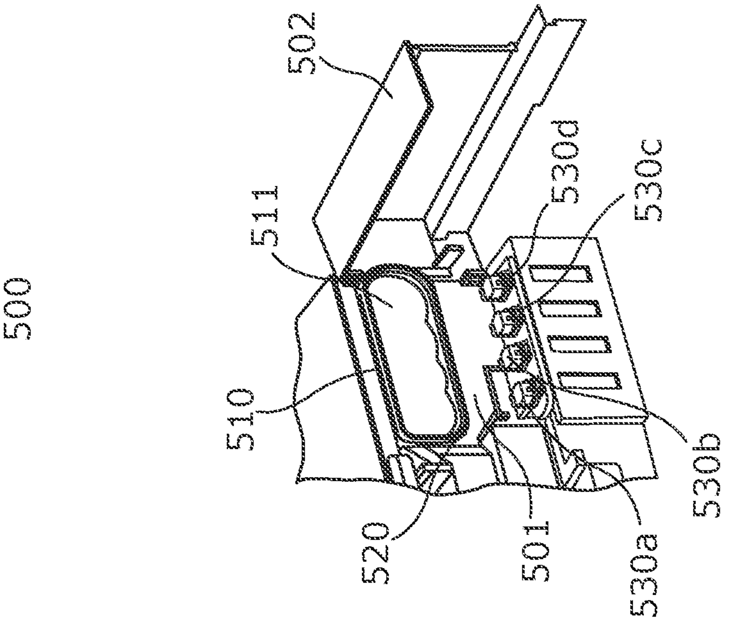
FIG. 5A shows a printing system having a foldable frame in a folded position, according to an example.

Referring now to FIG. 5A, a printing system 500 comprising a supporting structure in a folded position is shown. The printing system 500 comprises a reference surface 501, a printing system access door 502, the supporting structure, a plurality of printing fluid input ports, and a plurality of printing fluid tanks. As previously described, printing systems may use printing fluid tanks to store printing fluid to be used during printing operations, where the printing fluid tanks are refilled by performing refilling operations in which printing fluid supply containers are fluidly connected to the printing fluid tanks.

In the printing system 500 represented in FIG. 5A, the supporting structure comprises a foldable frame 510 in a folded position and a pivoting element 520 to enable a rotation of the foldable frame 510 with respect to the reference surface 501. In particular, the pivoting element 520 is to enable a rotation from the folded position to a deployed position in which the foldable frame 510 is to receive printing fluid containers in a vertical position in a plurality of apertures 511. In the printing system 500, the plurality of apertures 511 of the frame 510 corresponds to a plurality of overlapping apertures. In this fashion, the overall size of the supporting structure is reduced compared to other frames in which the apertures of the plurality of apertures 511 do not overlap with each other.

The plurality of printing fluid input ports of the printing system 500 comprises a first printing fluid input port 530*a*, a second printing fluid input port 530*b*, a third printing fluid input port 530*c*, and a fourth printing fluid input port 530*d*. As explained above, each printing fluid input port is arranged to be associated with an aperture of the plurality of apertures 511 of the frame 510. Hence, due to the dimensional constraints defined by the plurality of overlapping apertures, users of the printing system 500 will be capable of connecting multiple printing fluid containers to non-adjacent printing fluid input ports (i.e., the first and the third printing fluid input ports 530*a*, 530*c*, the second and the fourth printing fluid input ports 530*b*, 530*d*, or the first and the fourth printing fluid input ports 530*a*, 530*d*).

Although not represented in FIG. 5A, in some examples, the frame 510 may comprise a snap-fit element connectable to the reference surface 501 of the printing system 500. Also, in other examples, the pivoting element 520 may comprise a biasing element to bias the frame 510 to the folded position.

Referring now to FIG. 5B, the printing system 500 of FIG. 5A is shown with the foldable frame 510 in the deployed position. In the deployed position, the foldable frame 510 is to receive a plurality of printing fluid containers in a vertical position in the plurality of apertures 511.

As previously explained in FIG. 5A, the printing system 500 comprises a plurality of printing fluid tanks for storing printing fluid. In FIG. 5B, the plurality of printing fluid tanks comprises a first printing fluid tank 540*a*, a second printing fluid tank 540*b*, a third printing fluid tank 540*c*, and a fourth printing fluid tank 540*d*, where each printing fluid tank is fluidly connected to a respective printing fluid inlet port.

In some examples, the foldable frame 510 may be moved from the folded position (shown in FIG. 5A) to the deployed position (shown in FIG. 5B) by a user. However, in other examples, the foldable frame 510 may be moved to the deployed position by a member of the printing system 500 (for instance, the printing system access door 502 of the printing system 500). In an example, the printing system access door 502 of the printing system 500 comprises an inner U-shaped member to receive a portion of the foldable frame 510 when the printing system access door 502 is closed and the foldable frame 510 is in the folded position. Then, upon opening the printing system access door 502, the foldable frame 510 and the U-shaped member will be decoupled and the foldable frame 510 is to move to the deployed position. In an example, the U-shaped member may be located in an internal surface of the printing system access door 502, such as the vertical surface or the horizontal surface of the access door 502 of the printing system 500.

Referring now to FIG. 5C, the printing system 500 of FIG. 5B is shown when performing a refilling operation using a first printing fluid container 550*b* and a second printing fluid container 550*d*. In order to connect the printing fluid containers to their respective printing fluid tanks, the second printing fluid input port 530*b* and the fourth printing fluid input port 530*d* have been decapped prior to inserting the printing fluid containers. Then, upon decapping the input ports and inserting the printing fluid containers, the printing fluid containers are fluidly connected to the printing fluid tanks via the printing fluid input ports. In particular, in the printing system 500 of FIG. 5C, the first printing fluid container 550*b* is fluidly connected to the second printing fluid tank 540*b* via the second printing fluid input port 530*b* and the second printing fluid container 550*d* is fluidly connected to the second printing fluid tank 540*b* via the second printing fluid input port 530*b*.

Although the printing fluid input ports of the printing system 500 explained in FIGS. 5A to 5C have to be decapped before connecting a printing fluid receptacle, in other examples, the printing fluid input ports may not include a cap. As a result, when performing a refilling operation, the user may have to insert the printing fluid receptacle within an aperture of the plurality of apertures 511 of the foldable frame 510, and then, when the printing fluid receptacle is coupled to the printing fluid input port, the printing fluid tank and the printing fluid receptacle will be fluidly connected.

As described above, refilling operations using the described supporting structure are safer and more efficient than alternative refilling operations which may have to be performed by the user of the printing system. For instance, upon connecting each of the printing fluid receptacles to the input ports, the respective printing fluid tanks will start to receive printing fluid from the printing fluid containers. In turn, due to the refilling operation may take some time to be performed, users may be able of performing other operations rather than holding the printing fluid containers in place.

Figure 6:
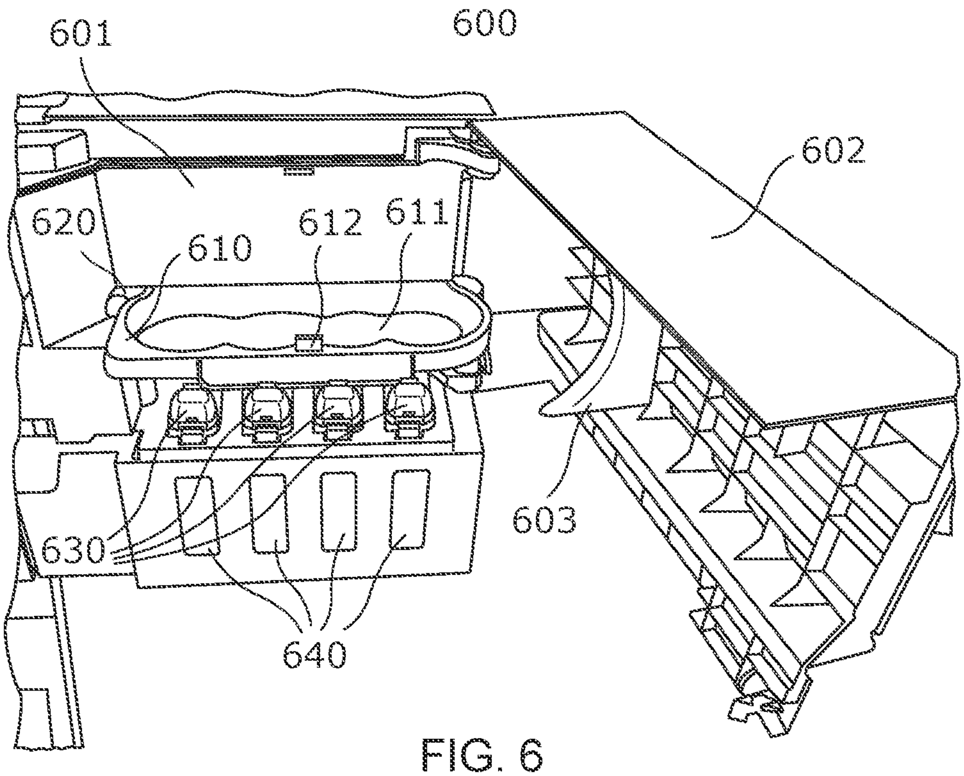
FIG. 6 shows a printing system comprising a printing system access door having an inner protruding guiding track, according to an example.

Referring now to FIG. 6, a printing system 600 having a printing system access door 602 in an open position is shown. The printing system 600 comprises a reference surface 601, the printing system access door 602, a supporting structure comprising a foldable frame 610 and a pivoting element 620, a plurality of printing fluid input ports 630, and a plurality of printing fluid tanks 640. In FIG. 6, an upper surface of a distal region of the foldable frame 610 comprises a snap-fit element 612 connectable to a snap-fit complementary aperture of the reference surface 601. In this fashion, the foldable frame 610 can be held in the folded position in which the foldable frame 610 is aligned with the reference surface 601 of the printing system 600. Then, upon releasing the snap-fit element 612, the foldable frame 610 can rotate about the pivoting element 620.

The foldable frame 610 of the printing system 600 comprises a plurality of apertures 611 to receive a plurality of printing fluid containers. In FIG. 6, the plurality of apertures 611 corresponds to a plurality of overlapping apertures. However, in other examples, the supporting structure may be replaced with any of the supporting structures previously explained in reference to FIGS. 1 to 4.

The printing system access door 602 of the printing system 600 comprises an inner protruding guiding track 603 on an internal surface facing the printing system 600. In the open position of the printing system access door 602, the inner protruding guiding track 603 does not contact the foldable frame 610. On the other hand, in the closed position of the printing system access door 602, the inner protruding guiding track 603 holds the foldable frame 610 in the folded position. To rotate the foldable frame 610 from the deployed position to the folded position, the inner protruding guiding track 603 comprises a sloped profile. In particular, in the printing system 600 of FIG. 6, the inner protruding guiding track 603 has an arc-shaped profile. Hence, a movement of the printing system access door 602 from the open position to the closed position will result in a rotation of the foldable frame 610 towards the folded position.

Figure 7:
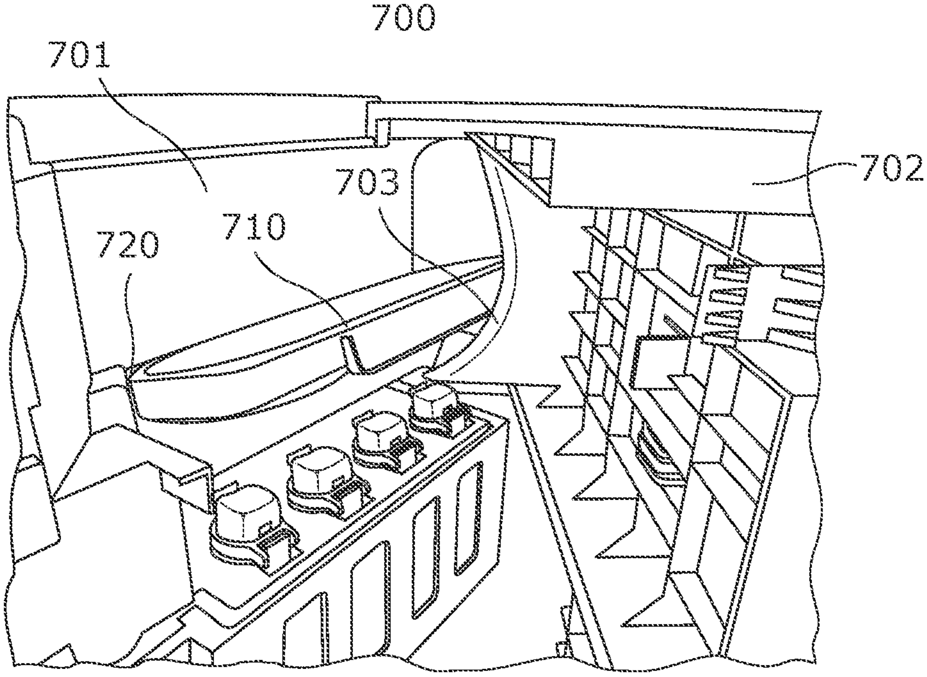
FIG. 7 shows a printing system having an inner protruding guiding track of a printing system access door in contact with a foldable frame, according to an example.

Referring now to FIG. 7, a printing system 700 is shown. The printing system 700 comprises a reference surface 701, a printing system access door 702, and a supporting structure comprising a foldable frame 710 and a pivoting element 720. In FIG. 7, the foldable frame 710 is represented in a position corresponding to an intermediate position between the folded position and the deployed position.

In order to rotate the foldable frame 710 about the pivoting element 720, an inner protruding guiding track 703 of the printing system access door 702 contacts a distal edge of the foldable frame 710. In this fashion, a movement of the printing system access door 702 from the open position to the closed position causes the distal edge of the foldable frame 710 to move upwards, and hence, the foldable frame 710 rotates towards the folded position. Similarly, a movement of the printing system access door 702 from the closed position to the open position causes the distal edge of the foldable frame 710 to move downwards, and hence, the foldable frame 710 rotates towards the deployed position. In some other examples, the reference surface 701 may comprise a latch member to lock the foldable frame 710 in the folded position. In some other examples, the pivoting element 720 may comprise a locking member to lock a rotation of the foldable frame 710 about the pivoting element 720.

In some examples, the inner protruding guiding track 703 may comprise a profile to move the distal edge of the foldable frame 710 in accordance with the movement of the printing system access door 702. In this fashion, the movement of the foldable frame 710 is associated with a position of the printing system access door 702. Therefore, when users aim to perform a refilling operation, users have to open the printing system access door 702 and insert the desired printing fluid containers in the desired locations of the foldable frame 710.

In some examples, the plurality of apertures of the foldable frame 710 may be a plurality of overlapping apertures. As a result, the frame 710 is to receive the printing fluid containers in non-adjacent apertures. However, in other examples, the apertures of the foldable frame 710 may be distributed such that to receive printing fluid receptacles in adjacent apertures, as previously explained in reference to FIGS. 1 to 4.

In some other examples, each aperture of the plurality of apertures of the foldable frame 710 may comprise a clamping member to secure a vertical position of the printing fluid receptacle previously inserted. In an example, the clamping member may be biased towards an inner region of the aperture (i.e., towards the inserted printing fluid container).

In further examples, the pivoting element 720 of the supporting structure comprises a biasing member to bias the frame 710 towards a deployed position. Therefore, upon the printing system access door 702 is opened, the biasing member is to rotate the frame 710 towards the deployed position in which the frame 610 is to receive the printing fluid containers.

Figure 8:
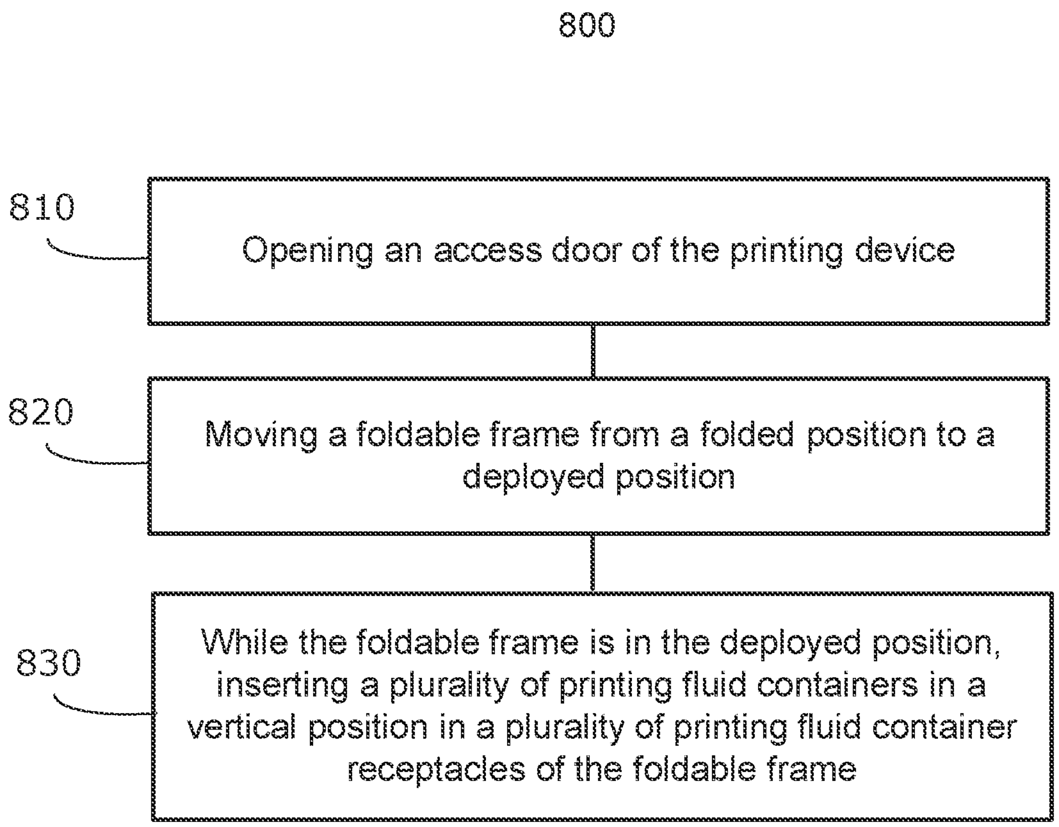
FIG. 8 shows a method for refilling printing fluid tanks of a printing device, according to an example.

Referring now to FIG. 8, a method 800 for performing a refilling operation using a supporting structure is shown. As previously described, the refilling operation may comprise supplying printing fluid tanks of a printing device with printing fluid. At block 810, method 800 comprises opening an access door of the printing device. The access door of the printing device may correspond, for instance, to the printing system access doors 502, 602, and 702 previously explained in reference to FIGS. 5A to 7. Then, at block 820, method 800 comprises moving a foldable frame from a folded position to a deployed position. The foldable frame may be part of a supporting structure, where the supporting structure further comprises a pivoting element to enable a rotation of the foldable frame with respect to a reference surface of the printing device. At block 830, method 800 comprises inserting a plurality of printing fluid container in a vertical position in a plurality of printing fluid container receptacles of the foldable frame while the foldable frame is in the deployed position. As a result of the insertion of the printing fluid containers in the plurality of printing fluid container receptacles, the printing fluid receptacles become fluidly connected to the printing fluid tanks via a plurality of printing fluid container input connectors. In other words, inserting the plurality of printing fluid containers comprises fluidly connecting the plurality of printing fluid containers to printing fluid tanks of the printing device via a plurality of printing fluid container input connectors.

In an example, moving the foldable frame from the folded position to the deployed position (block 820) comprises at least one of unlocking a latch member of the printing device or actuating a deployment member. In other examples, the pivoting element of the supporting structure may comprise a biasing element to bias the foldable frame to the deployed position, and hence, block 820 may be performed while the access door of the printing device is opening (i.e., blocks 810 and 820 may overlap).

In other examples, when the printing fluid container input connectors of the printing device comprise capping elements, method 800 may further comprise decapping the plurality of printing fluid container connectors. In some examples, when the plurality of receptacles of the foldable frame is a plurality of overlapping receptacles, inserting the printing fluid containers further comprises inserting the printing fluid container in non-adjacent receptacles of the plurality of printing fluid container receptacles such that the printing fluid containers are fluidly connected to the printing fluid tanks via non-adjacent connectors of the plurality of printing fluid container input connectors.

In some other examples, the access door of the printing device may comprise an inner protruding guiding track to move the foldable frame back to the folded position when the access door is moved to a closed position. As a result, a movement of the access door towards the closed position causes contact between the inner protruding guiding track and the foldable frame which moves the foldable frame towards the folded position. In other examples, method 800 may further comprise removing the printing fluid containers from the plurality of printing fluid container receptacles and closing the access door of the printing device so that the inner protruding guiding track of the access door moves the foldable frame to the folded position.

According to other examples, method 800 may further comprise engaging a snap-fit element of the foldable frame to a snap-fit element complementary aperture on the reference surface of the printing device in order to lock the frame in the folded position in which the foldable frame is aligned with the reference surface of the printing device.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims (and their equivalents) in which all terms are meant in their broadest reasonable sense unless otherwise indicated.

What is claimed is:

1. A printing fluid container supporting structure comprising:
- a frame comprising a plurality of printing fluid container receptacles arranged to correspond to printing fluid input ports of a printing device; and
- a pivoting element coupled to the frame and to a reference surface of the printing device, wherein the pivoting element is to enable the frame to rotate between a folded position in which the frame is aligned with the reference surface of the printing device and a deployed position in which the plurality of container receptacles of the frame is to support a plurality of printing fluid containers connected to the printing fluid input ports in a vertical position.

2. The printing fluid container supporting structure of claim 1, wherein a distal region of the frame comprises a snap-fit element connectable to the reference surface of the printing device, wherein in the folded position, the snap-fit element is connected to the reference surface.

3. The printing fluid container support structure of claim 1, further comprising a biasing element to bias the frame to the folded position.

4. The printing fluid container support structure of claim 3, wherein the pivoting element comprises a locking member to lock a rotation of the frame with respect to the reference surface of the printing device.

5. The printing fluid container support structure of claim 1, wherein the plurality of printing fluid container receptacles is to support a plurality of printing fluid containers connected to non-adjacent ports of the printing fluid input ports.

6. The printing fluid container support structure of claim 5, wherein each receptacle of the plurality of printing fluid container receptacles comprises a clamping member biased towards an inner region of the receptacle.

7. A printing system comprising:
- a reference surface;
- a supporting structure rotatably coupled to the reference surface via a pivoting element, wherein the supporting structure comprises a foldable frame comprising a plurality of apertures; and
- printing fluid container input connectors associated with the plurality of apertures,
- wherein in a deployed position, the foldable frame is to receive in the plurality of apertures a plurality of printing fluid containers in a vertical position, wherein the plurality of printing fluid containers is to connect to the printing fluid container input connectors.

8. The printing system of claim 7, further comprising a printing system access door comprising an inner protruding guiding track, wherein a movement of the printing system access door from an open position to a closed position results in a contact between the inner protruding guiding track and an edge of the foldable frame, wherein the contact results in a movement of the foldable frame from the deployed position to a folded position in which the supporting structure is aligned with the reference surface.

9. The printing system of claim 8, wherein the inner protruding guiding track comprises an arc-shaped profile.

10. The printing system of claim 8, wherein the supporting structure further comprises a biasing member to bias the foldable frame to the deployed position.

11. The printing system of claim 7, wherein the plurality of apertures is a plurality of overlapping circular apertures arranged to receive the plurality of printing fluid containers in non-adjacent apertures.

12. A method for refilling printing fluid tanks of a printing device, the method comprising:
- opening an access door of the printing device;
- moving a foldable frame of a printing fluid container supporting structure from a folded position to a deployed position; and
- while the foldable frame is in the deployed position, inserting a plurality of printing fluid containers in a vertical position in a plurality of printing fluid container receptacles of the foldable frame,
- wherein inserting the plurality of printing fluid containers comprises fluidly connecting the plurality of printing fluid containers to printing fluid tanks of the printing device via a plurality of printing fluid container input connectors.

13. The method of claim 12, the method further comprising:
- decapping the plurality of printing fluid container input connectors,
- wherein inserting the printing fluid containers comprises inserting the printing fluid containers in non-adjacent receptacles of the plurality of printing fluid container receptacles such that the printing fluid containers are fluidly connected to the printing fluid tanks via non-adjacent connectors of the plurality of printing fluid container input connectors.

14. The method of claim 12, the method further comprising:
- removing the printing fluid containers from the plurality of printing fluid container receptacles; and
- closing the access door of the printing device so that an inner protruding guiding track of the access door moves the foldable frame to the folded position.

15. The method of claim 12, wherein moving the foldable frame from the folded position to the deployed position comprises at least one of:

unlocking a latch member of the printing device; and actuating a deployment member.

* * * * *